United States Patent
Vitebsky et al.

(10) Patent No.: US 12,067,487 B2
(45) Date of Patent: Aug. 20, 2024

(54) METHOD AND APPARATUS EMPLOYING DISTRIBUTED SENSING AND DEEP LEARNING FOR DYNAMIC SPECTRUM ACCESS AND SPECTRUM SHARING

(71) Applicant: CACI, Inc.—Federal, Arlington, VA (US)

(72) Inventors: Stanley Vitebsky, Millburn, NJ (US); Marc J. Beacken, Randolph, NJ (US)

(73) Assignee: CACI, Inc.—Federal, Reston, VA (US)

( * ) Notice: Subject to any disclaimer, the term of this patent is extended or adjusted under 35 U.S.C. 154(b) by 1157 days.

(21) Appl. No.: 16/854,289

(22) Filed: Apr. 21, 2020

(65) Prior Publication Data

US 2021/0326695 A1    Oct. 21, 2021

(51) Int. Cl.
*G06N 3/08* (2023.01)
*H04L 43/0888* (2022.01)
(Continued)

(52) U.S. Cl.
CPC ............ *G06N 3/08* (2013.01); *H04L 43/0888* (2013.01); *H04W 16/00* (2013.01); *H04W 16/02* (2013.01);
(Continued)

(58) Field of Classification Search
CPC .......... G06N 3/08; G06N 3/044; G06N 3/045; H04L 43/0888; H04L 41/0894;
(Continued)

(56) References Cited

U.S. PATENT DOCUMENTS 11,514,305 B1 * 11/2022 Commons ................ G06N 3/04
11,641,579 B1 *  5/2023 Mukherjee ............ H04W 48/18
                                                             370/329
(Continued)

OTHER PUBLICATIONS

Sha, Akhbar, et al. "Deep Reinforcement Learning for Brain Aneurysm Segmentation in 3D TOF MRA Images: A Comparative Study using 3D U-Net, 3D ResNet, and LSTM Networks." 2023 2nd International Conference on Automation, Computing and Renewable Systems (ICACRS). IEEE, 2023. (Year: 2023).*
(Continued)

*Primary Examiner* — Sharad Rampuria
(74) *Attorney, Agent, or Firm* — BakerHostetler

(57) ABSTRACT

The present application describes a method for training a neural network via deep reinforcement learning (DRL) in a RF network. The method includes a step of receiving, via the neural network, a policy from a third party. The method also includes a step of receiving, via the neural network, features of plural telecommunication groups located in an RF network. The method also includes a step of observing, via the neural network, a graphical representation of the received features of the plural telecommunication groups in the RF network. The method further includes a step of assigning, based on the observation, one of the plural telecommunication groups to one of plural channels in the RF network. The method even further includes a step of determining, via the neural network, a change in throughput of the RF network based on the assignment. The method yet even further incudes as step of adjusting, based on the determined change in throughput, the policy received from the third party.

20 Claims, 10 Drawing Sheets

(51) Int. Cl.
  *H04W 16/00*  (2009.01)
  *H04W 16/02*  (2009.01)
  *H04W 24/06*  (2009.01)
  *H04W 24/08*  (2009.01)
  *H04W 28/22*  (2009.01)

(52) U.S. Cl.
  CPC ........... *H04W 24/06* (2013.01); *H04W 24/08* (2013.01); *H04W 28/22* (2013.01)

(58) Field of Classification Search
  CPC ...... H04L 41/16; H04W 16/00; H04W 16/02; H04W 24/06; H04W 24/08; H04W 28/22; H04W 16/18; H04W 24/10; H04W 24/02; H04W 16/14
  See application file for complete search history.

(56) References Cited

U.S. PATENT DOCUMENTS

2022/0322107 A1* 10/2022 Wang .................... H04W 24/02
2022/0343161 A1* 10/2022 Restuccia ............. G06N 3/045

OTHER PUBLICATIONS

Shuaijun Liu et al.; "Deep Reinforcement Learning Based Dynamic Channel Allocation Algorithm In Multibeam Satellite Systems"; IEEE Access; vol. 6; 2018; pp. 15733-15742.
Hao Song et al.; "Deep Q-Network Based Power Allocation Meets Reservoir Computing In Distributed Dynamic Spectrum Access Networks"; IEEE Infocom Workshops; 2019; pp. 774-779.

* cited by examiner

METHOD AND APPARATUS EMPLOYING DISTRIBUTED SENSING AND DEEP LEARNING FOR DYNAMIC SPECTRUM ACCESS AND SPECTRUM SHARING

FIELD

This application is generally directed to employing deep learning techniques for improving dynamic spectrum access and spectrum sharing in a network.

BACKGROUND

Radio transceivers do not all operate in a heterogenous manner. For example, they may operate on different access schemes, transmit powers, communication protocols and modulation types, mobility, and data rate demands. When common spectrum is used to collectively accommodate the radio transceivers' differences, traditional optimization techniques prove difficult to implement. Namely, such techniques are computationally burdensome. Second, the techniques are unable to capture the dynamics of the environment, such as for example, user arrival, departure, change in communication needs, change in power, and motion through the environment.

Traditional optimization techniques also rely on imprecise assumptions. For example, it is generally assumed RF propagation in the real world can be accurately described by analytical models. But in complex environments, adequately capturing the effects of the terrain and characteristics of different transceivers via analytic models is impractical.

The total number of mobile terminals connected to the 5G communication network is expected to pass 1,000 billion in the near future. The number of internet of things (IoT) device connections worldwide will also grow rapidly. With the increase in the number of massive IoT devices available, the problem of shortage of frequency spectrum resources is increasingly serious. Coincidentally most of the allocated spectrum is not efficiently utilized.

What is desired in the art is a technique and architecture for improving dynamic spectrum access and spectrum sharing in a network.

SUMMARY

The foregoing needs are met, to a great extent, by the disclosed systems, methods, and techniques for predicting electromechanical device failure.

One aspect of the patent application is directed to a method for training a neural network via deep reinforcement learning (DRL) in a RF network. The method includes a step of receiving, via the neural network, a policy from a third party. The method also includes a step of receiving, via the neural network, features of plural telecommunication groups located in an RF network. The method also includes a step of observing, via the neural network, a graphical representation of the received features of the plural telecommunication groups in the RF network. The method further includes a step of assigning, based on the observation, one of the plural telecommunication groups to one of plural channels in the RF network. The method even further includes a step of determining, via the neural network, a change in throughput of the RF network based on the assignment. The method yet even further incudes as step of adjusting, based on the determined change in throughput, the policy received from the third party.

Another aspect of the application is directed to a method of training a neural network in a virtual environment. The method includes a step of receiving, via the neural network, simulated features of plural telecommunication groups in an RF network. The method includes a step of observing, via the neural network, a graphical representation of the received simulated features of the plural telecommunication groups in the RF network. The method also includes a step of assigning, based on the observation, one of the plural telecommunication groups to one of plural channels in the RF network. The method further includes a step of running the assignment of the one telecommunication group to one of the plural channels in the RF network through a separately trained neural network. The method even further includes a step of receiving, via the separately trained neural network, a change in throughput based on the assignment. The method yet even further includes a step of adjusting, based on the received change in throughput, a training policy of the neural network operating in the virtual environment.

There has thus been outlined, rather broadly, certain embodiments of the application in order that the detailed description thereof herein may be better understood, and in order that the present contribution to the art may be better appreciated. There are, of course, additional embodiments of the application that will be described below and which will form the subject matter of the claims appended hereto.

BRIEF DESCRIPTION OF THE DRAWINGS

To facilitate a fuller understanding of the application, reference is made to the accompanying drawings, in which like elements are referenced with like numerals. These drawings should not be construed to limit the application and are intended only for illustrative purposes.

DETAILED DESCRIPTION

Figure 1A:
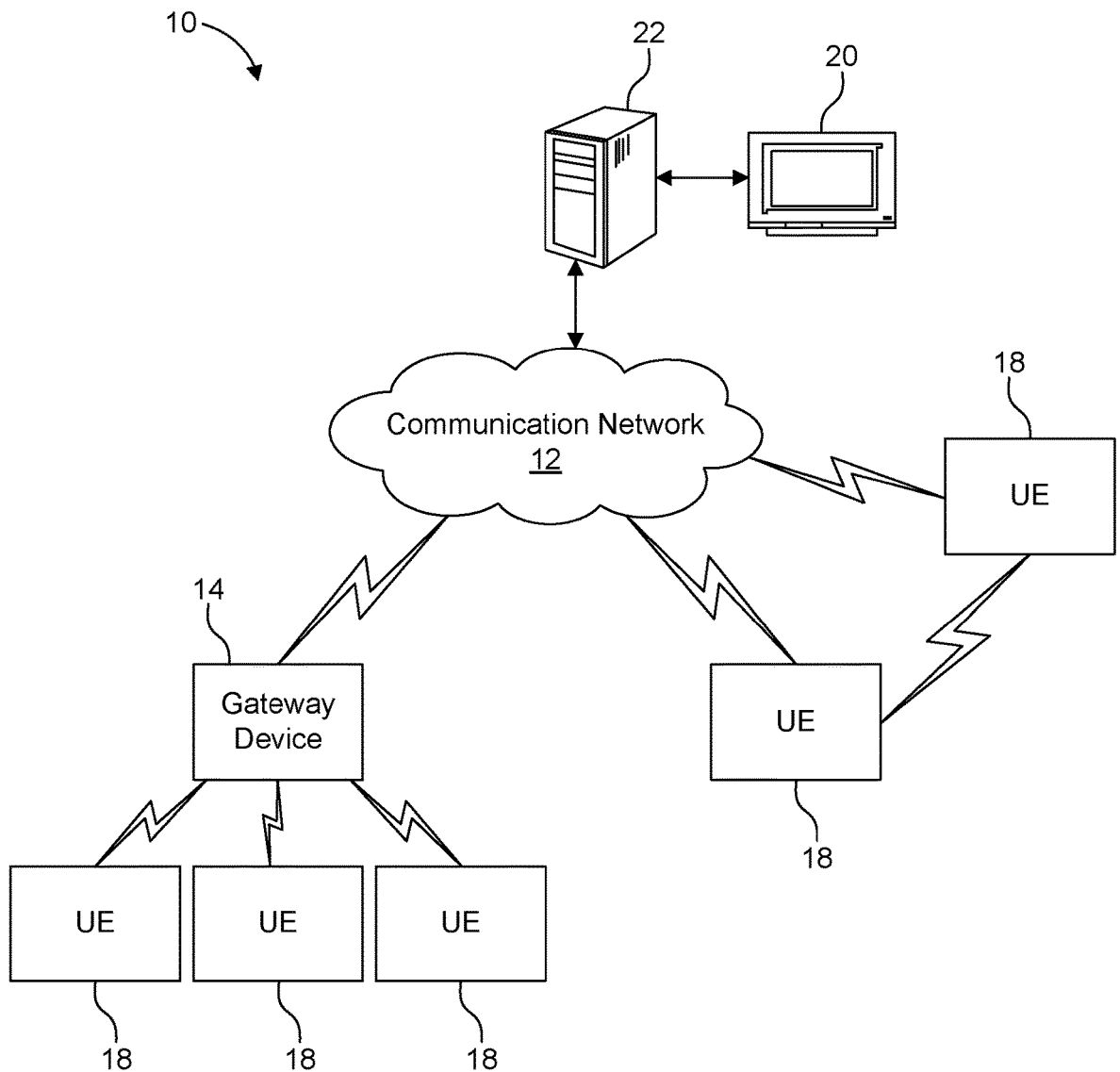
FIG. 1A illustrates a system diagram of an exemplary communication system in which one or more disclosed embodiments may be implemented.

Before explaining at least one embodiment of the application in detail, it is to be understood that the application is not limited in its application to the details of construction and to the arrangements of the components set forth in the following description or illustrated in the drawings. The application is capable of embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not for other embodiments.

An artificial intelligence system may apply machine learning to identify predictive anomalies in sensor data captured by one or more sensors positioned on or near an electromechanical device. For example, sensor data can indicate an intermittent electrical failure, wear of a bearing or other contact surface, motor irregularities, gear defects (e.g., a missing tooth) or other anomaly that may lead eventually to catastrophic failure. The artificial intelligence system can use any one of a number of machine learning algorithms to include but not limited to condition monitoring and prediction algorithm development, including deep learning. The condition and predictive approach allows monitoring of electromechanical devices without setting performance criteria, which could vary by implementation, location, weather conditions, or other circumstances. The individualized nature of the condition and predictive monitoring system can allow the system to be adaptive to a variety of conditions and implementations.

FIG. 1A is a diagram of an example communication system 10 (e.g., labeled as reference indicator 10 in FIG. 1A with a similar format used throughout for other elements in the figures of this application) in which one or more disclosed embodiments may be implemented. As shown in FIG. 1A, the communication system 10 includes a communication network 12. The communication network 12 may be a fixed network (e.g., Ethernet, Fiber, Integrated Services Digital Network (ISDN), Power Line Communication (PLC), or the like), a wireless network (e.g., Wireless Local Area Network (WLAN), cellular, or the like), or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as CDMA, time division multiple access (TDMA), frequency division multiple access (FDMA), orthogonal FDMA (OFDMA), single-carrier FDMA (SC-FDMA), and the like. Further, the communication network 12 may comprise other networks, such as a core network, the Internet, a sensor network, an industrial control network, a personal area network, a fused personal network, a satellite network, a home network, or an enterprise network.

As shown in FIG. 1A, the communication system 10 may include gateway devices 14 and terminal devices 18. It will be appreciated that any number of Gateway Devices 14 and terminal devices 18 may be included in the communication system 10 as desired. Each of the gateway devices 14 and terminal devices 18 are configured to transmit and receive signals, such as via communications circuitry, the communication network 12, or direct radio link. An gateway device 14 allows wireless devices (e.g., cellular and non-cellular) as well as fixed network M2M devices (e.g., PLC) to communicate either through operator networks, such as the communication network 12, or the direct radio link. For example, the terminal devices 18 may collect data and send the data, via the communication network 12 or direct radio link, to an application 20 or other terminal device 18. The terminal devices 18 may also receive data from the application 20 or another terminal device 18. In a further embodiment, data and signals may be sent to and received from the application 20 via a Service Layer 22, as described below. Terminal devices 18 and gateway devices 14 may communicate via various networks including, for example, cellular, WLAN, Wireless Personal Area Network (WPAN) (e.g., Zigbee, 6LoWPAN, Bluetooth), direct radio link, and wireline. Exemplary terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

As used herein, the gateway device refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "terminal device" refers to any component (or collection of components) capable of establishing a wireless connection with a base station, such as a user equipment (UE), a mobile station (STA), and other wirelessly enabled devices.

Figure 1B:
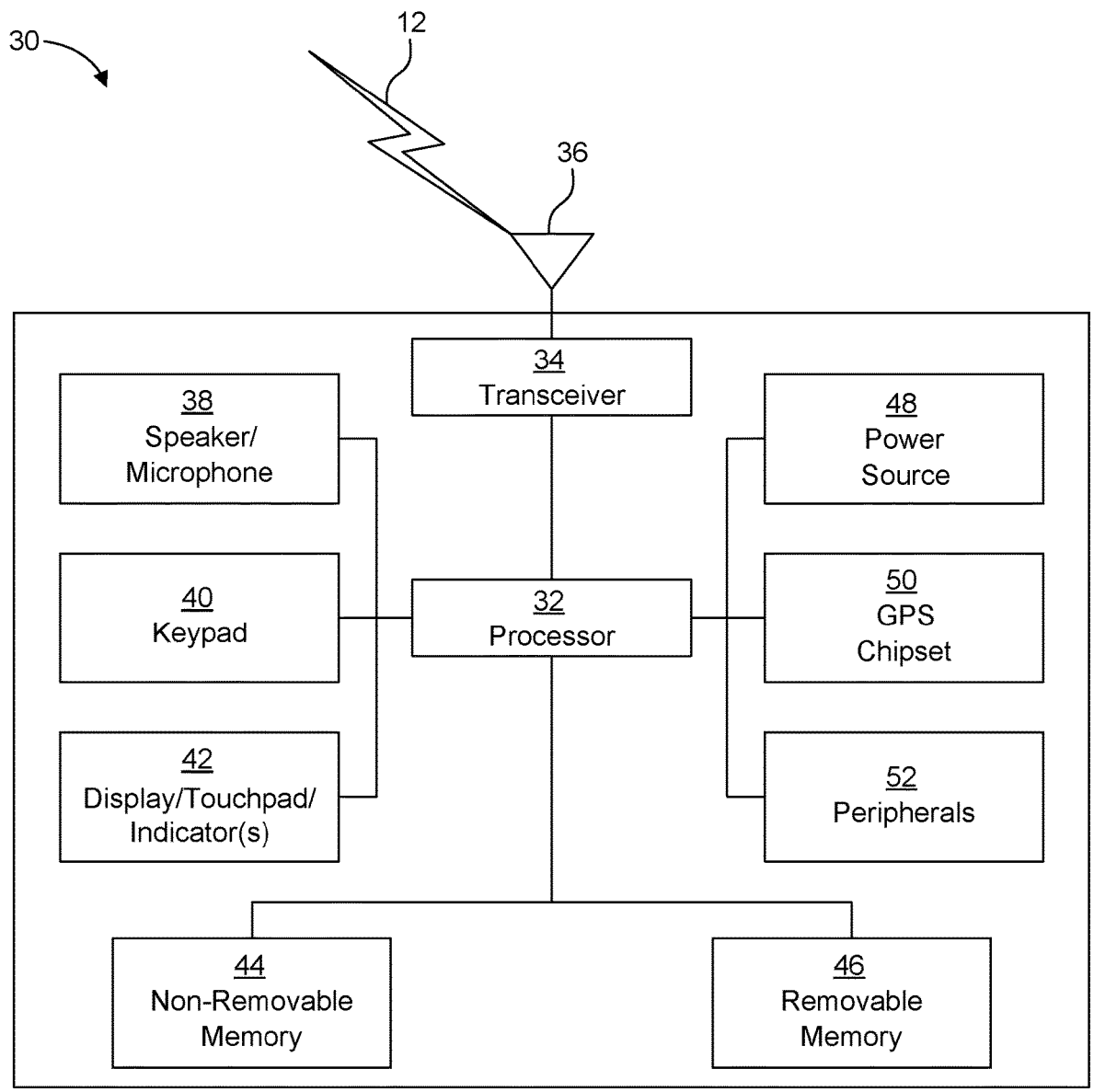
FIG. 1B illustrates a system diagram of an exemplary communication network node.

FIG. 1B is a block diagram of an exemplary hardware/software architecture of a node 30 of a network, such as clients, servers, or proxies, which may operate as an server, gateway, device, or other node in an network. The node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. The node 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node 30 in order to perform the various required functions of the node 30. For example, the processor 32 may perform signal coding, data processing, power control, input/output processing, and/or any other functionality that enables the node 30 to operate in a wireless or wired environment. The processor 32 may run application-layer programs (e.g., browsers) and/or radio-access-layer (RAN) programs and/or other communications programs. The processor 32 may also perform security operations, such as authentication, security key agreement, and/or cryptographic operations. The security operations may be performed, for example, at the access layer and/or application layer.

As shown in FIG. 1B, the processor 32 is coupled to its communication circuitry (e.g., transceiver 34 and transmit/receive element 36). The processor 32, through the execution of computer-executable instructions, may control the communication circuitry to cause the node 30 to communicate with other nodes via the network to which it is connected. While FIG. 1B depicts the processor 32 and the transceiver 34 as separate components, the processor 32 and the transceiver 34 may be integrated together in an electronic package or chip.

The transmit/receive element 36 may be configured to transmit signals to, or receive signals from, other nodes, including servers, gateways, wireless devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. The transmit/receive element 36 may be configured to transmit and/or receive any combination of wireless or wired signals.

In addition, although the transmit/receive element 36 is depicted in FIG. 1B as a single element, the node 30 may include any number of transmit/receive elements 36. More specifically, the node 30 may employ multiple-input and multiple-output (MIMO) technology. Thus, in an embodiment, the node 30 may include two or more transmit/receive elements 36 (e.g., multiple antennas) for transmitting and receiving wireless signals.

The transceiver 34 may be configured to modulate the signals to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as Universal Terrestrial Radio Access (UTRA) and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. The node 30 may acquire location information by way of any suitable location-determination method while remaining consistent with an embodiment.

The processor 32 may further be coupled to other peripherals 52, which may include one or more software and/or hardware modules that provide additional features, functionality, and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices. The node 30 may connect to other components, modules, or systems of such apparatuses or devices via one or more interconnect interfaces, such as an interconnect interface that may comprise one of the peripherals 52.

Figure 1C:
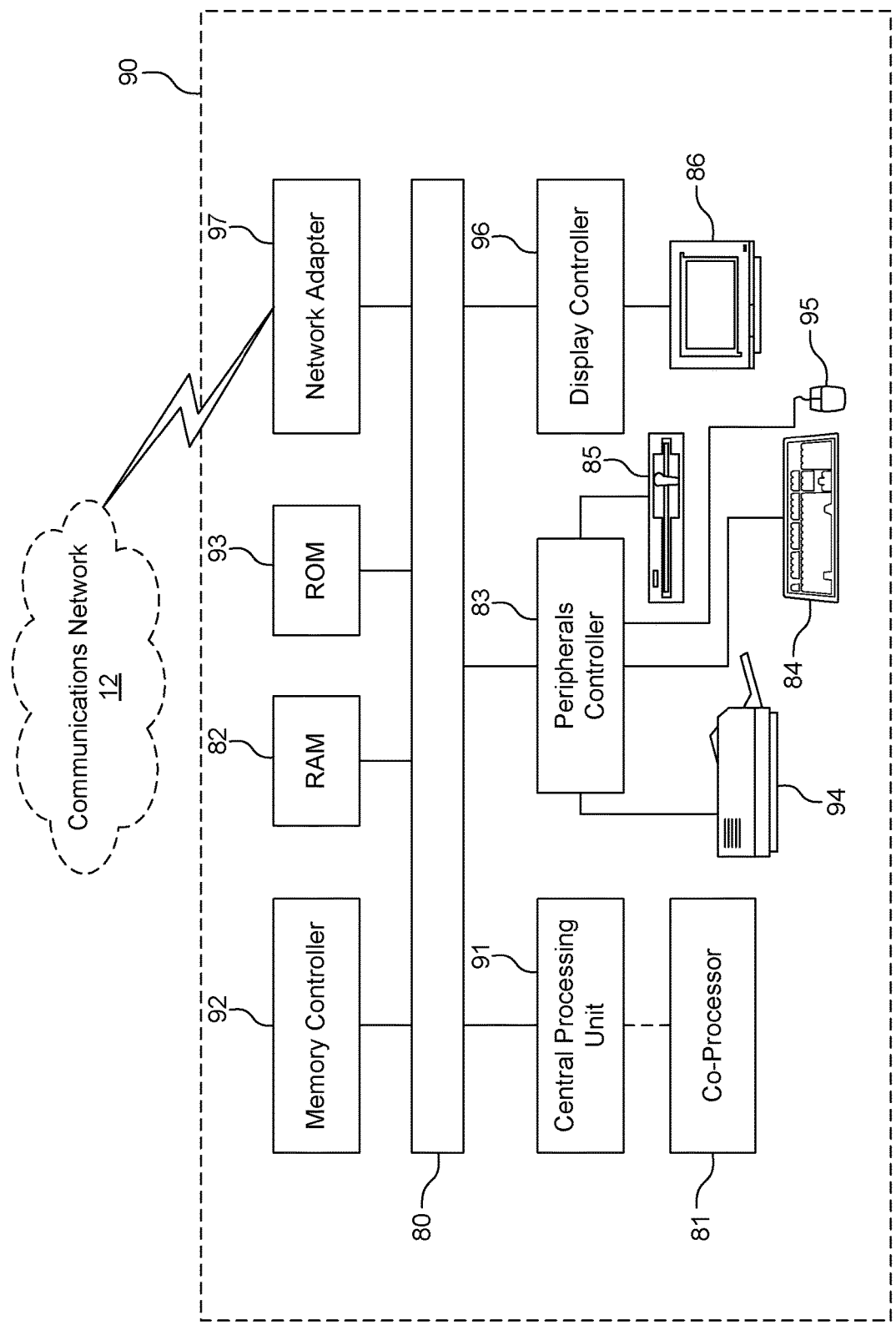
FIG. 1C illustrates a block diagram of an exemplary computing system.

FIG. 1C is a block diagram of an exemplary computing system 90 that may be used to implement one or more nodes (e.g., clients, servers, or proxies) of a network, and which may operate as a server, gateway, device, or other node in a network. The computing system 90 may comprise a computer or server and may be controlled primarily by computer-readable instructions, which may be in the form of software, by whatever means such software is stored or accessed. Such computer-readable instructions may be executed within a processor, such as a central processing unit (CPU) 91, to cause the computing system 90 to effectuate various operations. In many known workstations, servers, and personal computers, the CPU 91 is implemented by a single-chip CPU called a microprocessor. In other machines, the CPU 91 may comprise multiple processors. A co-processor 81 is an optional processor, distinct from the CPU 91 that performs additional functions or assists the CPU 91.

In operation, the CPU 91 fetches, decodes, executes instructions, and transfers information to and from other resources via the computer's main data-transfer path, a system bus 80. Such a system bus 80 connects the components in the computing system 90 and defines the medium for data exchange. The system bus 80 typically includes data lines for sending data, address lines for sending addresses, and control lines for sending interrupts and for operating the system bus 80. An example of such a system bus 80 is the PCI (Peripheral Component Interconnect) bus.

Memories coupled to the system bus 80 include RAM 82 and ROM 93. Such memories include circuitry that allows information to be stored and retrieved. The ROM 93 generally contains stored data that cannot easily be modified. Data stored in the RAM 82 may be read or changed by the CPU 91 or other hardware devices. Access to the RAM 82 and/or the ROM 93 may be controlled by a memory controller 92. The memory controller 92 may provide an address translation function that translates virtual addresses into physical addresses as instructions are executed. The memory controller 92 may also provide a memory protection function that isolates processes within the system and isolates system processes from user processes. Thus, a program running in a first mode may access only memory mapped by its own process virtual address space. It cannot access memory within another process's virtual address space unless memory sharing between the processes has been set up.

In addition, the computing system 90 may contain a peripherals controller 83 responsible for communicating instructions from the CPU 91 to peripherals, such as a printer 94, a keyboard 84, a mouse 95, and a disk drive 85.

A display 86, which is controlled by a display controller 96, is used to display visual output generated by the computing system 90. Such visual output may include text, graphics, animated graphics, and video. The display 86 may be implemented with a CRT-based video display, an LCD-based flat-panel display, gas plasma-based flat-panel display, or a touch-panel. The display controller 96 includes electronic components required to generate a video signal that is sent to the display 86.

Further, the computing system 90 may contain communication circuitry, such as a network adaptor 97, that may be used to connect the computing system 90 to an external communications network, such as the communication network 12 of FIG. 1A, to enable the computing system 90 to communicate with other nodes of the network.

Spectrum Sharing

Spectrum sharing is defined as two or more mobile communication systems that operate in the same band. Its attraction as a potential means of improving the overall spectrum usage efficiency has generated a strong interest as the increase of smart phones usage and fast growth of mobile broadband requirements by that and other usage creates a large need for finding new spectrum bands to serve the traffic. However, it is difficult to find new spectrum where there is sufficient availability and good frequency characteristics. At the same time there are certain frequency bands that are reserved for e.g. military, coast guard or other government use where the actual use of the spectrum by the incumbent owner age is typically limited to specific geographic location or times of the day or combinations of the two usage criteria. In wide geographic areas and/or large parts of time the spectrum can be empty of incumbent usage Spectrum sharing is a mobile communications licensing method that allows current spectrum owners (Incumbents) to share their spectrum with mobile network operators (Licensees) according to this regulatory framework (sharing framework) issued by a Regulator. The advantage of spectrum sharing is that Quality of Service (QOS) is supported even with that shared spectrum. This is achieved with help of protection measures, for example the definition of protection, exclusion and restriction zones by the incumbent.

Machine Learning

Machine learning is an area of artificial intelligence that includes the field of study that gives computers the capability to learn without being explicitly programmed. Specifically, machine learning can be a technology for researching and constructing a system for learning, predicting, and improving its own performance based on empirical data and an algorithm for the same. The algorithms of the Machine Learning take a method of constructing a specific model in order to obtain the prediction or the determination based on the input data, rather than performing the strictly defined static program instructions.

Many machine learning algorithms have been developed on how to classify data. Representative examples of such machine learning algorithms for data classification include a decision tree, a Bayesian network, a support vector machine (SVM), an artificial neural network (ANN), and so forth. ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections (weights), and acquires problem-solving capability as the strengths of the interconnections are adjusted, e.g., at least throughout training.

The terms 'artificial neural network' and 'neural network' may be used interchangeably herein.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth. Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

A convolutional neural network (CNN) consists of an input and an output layer, as well as multiple hidden layers. The hidden layers of a CNN typically consist of a series of convolutional layers that convolve with a multiplication or other dot product. The activation function is commonly a RELU layer, and is subsequently followed by additional convolutions such as pooling layers, fully connected layers and normalization layers, referred to as hidden layers because their inputs and outputs are masked by the activation function and final convolution.

The CNN computes an output value by applying a specific function to the input values coming from the receptive field in the previous layer. The function that is applied to the input values is determined by a vector of weights and a bias (typically real numbers). Learning, in a neural network, progresses by making iterative adjustments to these biases and weights. The vector of weights and the bias are called filters and represent particular features of the input (e.g., a particular shape).

A recurrent neural network (RNN) is a class of artificial neural networks where connections between nodes form a directed graph along a temporal sequence. Temporal dynamic behavior can be shown from the graph. RNNs employ internal state memory to process variable length sequences of inputs. RNN's can perform tasks such as unsegmented handwriting recognition, connected handwriting recognition, and speech recognition.

Deep Reinforcement Learning

Reinforcement learning is a technique in the field of artificial intelligence where a learning agent interacts with an environment and receives observations characterizing a current state of the environment. Namely, a deep reinforcement learning network is trained in a deep learning process to improve its intelligence for effectively selecting an action. The training of a deep learning network may be referred to as a deep learning method or process. The deep learning network may be a neural network, Q-learning network, dueling network, or any other applicable network.

Reinforcement learning may be based on a theory that given the condition under which a reinforcement learning agent can determine what action to choose at each time instance, the agent can find an optimal path to a solution solely based on experience of its interaction with the environment. For example, reinforcement learning may be performed mainly through a Markov decision process (MDP). Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until a future reward is maximized, thereby deriving an optimal policy.

Deep reinforcement learning (DRL) techniques capture the complexities of the RF environment in a model-free manner and learn about it from direct observation. DRL can be deployed in different ways such as for example via a centralized controller, hierarchal or in a fully distributed manner. There are many DRL algorithms and examples of their applications to various environments. In some embodiments, deep learning techniques may be used to solve complicated decision-making problems in wireless network optimization. For example, deep learning networks may be trained to adjust one or more parameters of a wireless network, or a plurality of cells in the wireless network. so as to achieve optimization of the wireless network with respect to an optimization goal.

Figure 2:
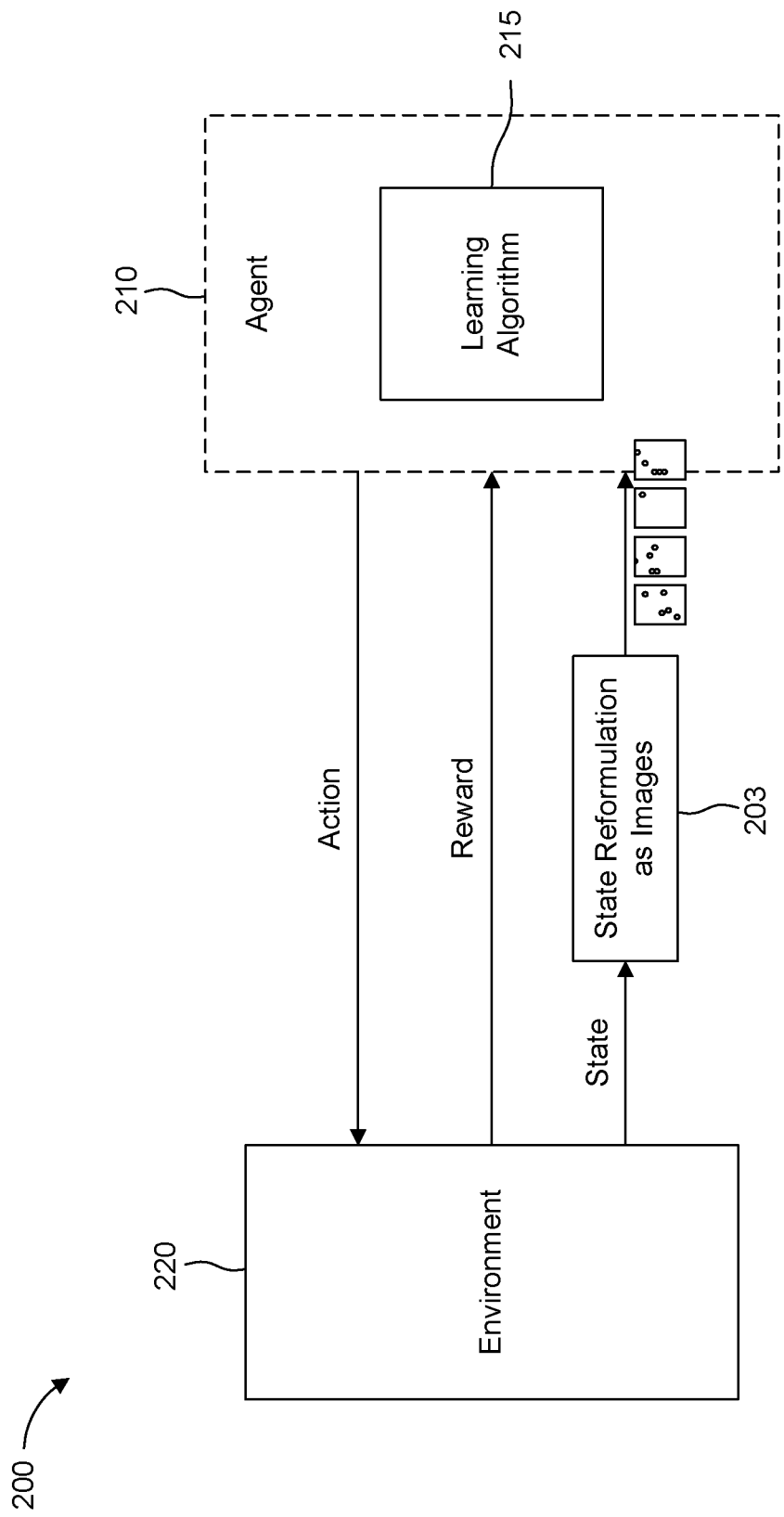
FIG. 2 illustrates a deep reinforcement learning architecture for dynamic spectrum access and spectrum sharing according to an aspect of the application.

FIG. 2 illustrates a schematic diagram of a reinforcement learning (RL) system 200. More particularly, the RL system 200 may be a deep reinforcement learning (DRL) system employing deep neural networks. The RL system 200 may use different types of deep learning networks, such as for example, a deep Q-network. Specifically, deep Q-Learning is a model-free reinforcement learning program. At a rudimentary level, the goal of deep Q-Learning is to learn a policy and subsequently tell an agent what action to take under what circumstances. Deep Q-learning finds a policy that is optimal in the sense that it maximizes the expected value of the total reward over any and all successive steps, starting from the current state.

According to the RL system 200, an RL agent 210 interacts with an environment 220 to take a sequence of actions (A) in order to maximize a cumulative reward (R). The RL agent 210 may be implemented by an algorithm or a control unit/module. In an exemplary embodiment, the RL agent 210 is a spectrum management controller that observes the RF environment using multi-dimensional images (or clips) created from user location information. The RL agent 210 chooses spectrum allocation actions and observes rewards. The sequence of preceding states, actions, rewards and resulting states are used for learning the optimal state-action mapping. The RL agent 210 is capable of selecting actions that allow exploration of new possibilities.

The environment 220 may be a geographic area and the radio spectrum where the wireless network of plurality of one or more telecommunication groups may be deployed, or a simulator simulating such a wireless network deployment. An observation of the environment may be a state of a wireless network including one or more multi-dimensional images with pixels representing the position in space and frequency and power assignment of one or more communication groups.

The RF environment 220 is represented by multi-dimensional images. The images may be 2D or 3D to model spatial location of communication entities. Pixels in the one or more images represent the position in space of communication groups. Each pixel includes certain features. For example, pixel intensity features may be indicative of signal power. More specifically, pixel intensity features may correspond to one or more of transmit power, signal to noise ratio (SNR) levels or measured interference. Separately, motion of transceivers/nodes may be captured through multiple successive frames from some time in the past until present. All of the frames constitute the state of the environment used for training a learning algorithm present in the RL agent 210.

Figure 3:
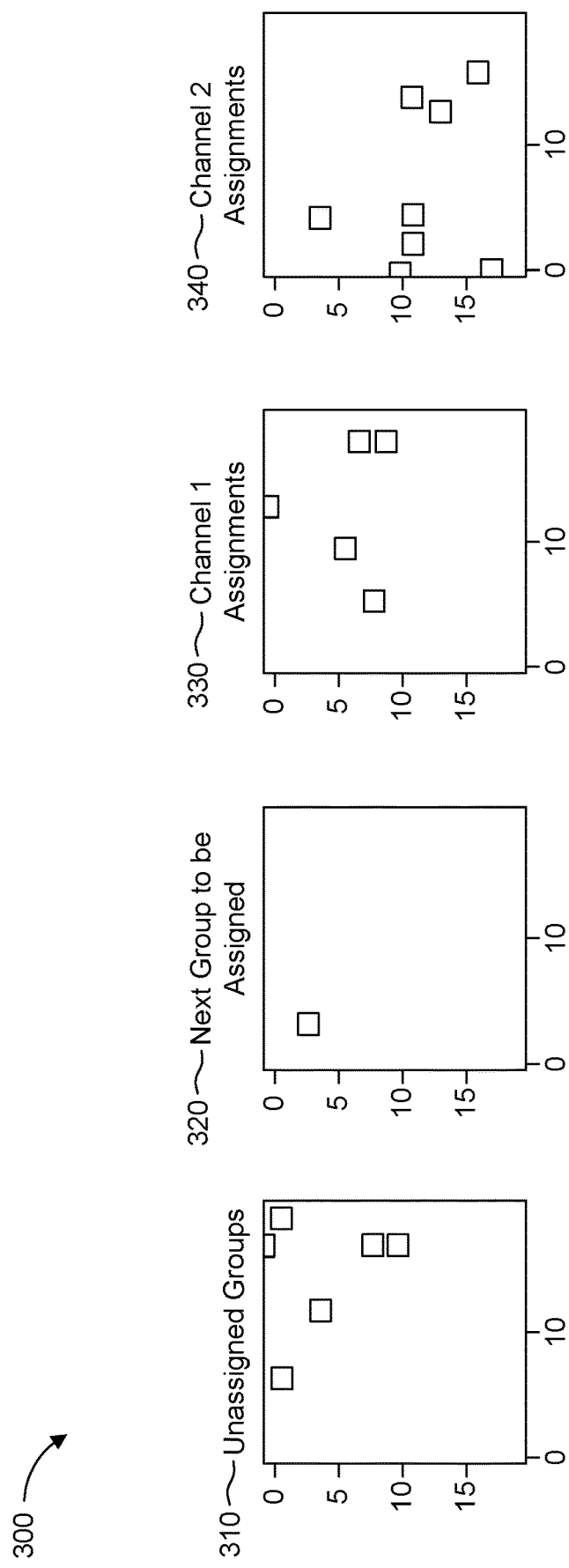
FIG. 3 illustrates an environmental state representation as a series of images according to an aspect of the application.

FIG. 3 illustrates an environmental state representation as a series of images, that form multiple layers of a multi-layer image used for CNN training. Plural images can correspond to an assignment status of each group. For example, these groups can include "one or more of an unassigned group(s)," "next group(s) to be assigned," and "assigned to channel 1 . . . N." As depicted in FIG. 3, the environmental state representation 300 includes unassigned groups 310, next group to be assigned 320, channel 1 assigned groups 330, and channel 2 assigned groups 340. Each image representation includes one or more pixels. The Action of the RL agent 210 is to assign a user group to a specific channel using a specific power level. For example, the user group may be assigned to any channel 1, . . . N or to multiple channels. Alternatively, the Action could be "Assign user group to channel 1, . . . N at a power level in the range [Pmin, Pmax])." The channels may have different bandwidths. The channels may also overlap in frequency, so that the assignment of the user group may be reflected on multiple images corresponding to overlapping channels.

According to an embodiment, the next group to be assigned 320 can be randomly selected. Alternatively, group assignment can be deterministically selected.

In an embodiment there may not be any information about unassigned groups 310. In other embodiments, there may not be any next group to be assigned 320. If so, the environment state representation 300 will not display such groups.

According to another embodiment, actions may include reallocation or reassignment of already assigned groups to different channels. Actions may also include revocations of existing assignments in favor of more desirable (e.g., higher potential reward) configurations. Spectrum usage policies may be reflected by appropriate masking off of certain actions (channel assignments) for certain groups of users.

Referring back to FIG. 2 employing the environmental state representation 300 in FIG. 3, the RL system 200 may begin with a first state ($S_t$) of the environment.

Based on the observation of $S_t$, the RL agent 210 selects an action $A_t$ to perform on the environment 220. The selected action performed on the environment 220 by the RL agent 210 causes the environment 220 to transition from the first state $S_t$ to a new state $S_{t+1}$. A reward $R_t$ is observed. A reward may be calculated according to a predefined cost function indicating an objective for adjusting or optimizing the environment 220. A reward is indicative of an action that positively or negatively contributes to moving the environment from one state to another state with respect to the cost function.

In an embodiment, the RL agent 210 may select a sequence of actions and apply them to the environment 220. In other embodiments, the RL agent 210 may select some actions randomly or according to a predefined rule or criterion. In even other embodiments, the RL agent 210 may determine an action to take using a learning network, such as a neural network. By applying the sequence of actions, a plurality of experience tuples ($S_t$, $A_t$, $R_t$, $S_{t+1}$) is generated. Each experience tuple represents an experience, and includes a first state $S_t$ of the environment, the second state $S_{t+1}$ of the environment, an action $A_t$ that causes the environment to transit from the first state $S_t$ to the second state $S_{t+1}$, and a reward value $R_t$ associated with the action $A_t$. The experience tuples indicate actions that move the environment from state to state. The experience tuples may also indicate what sequence of actions transition the environment towards an expected state. In instances where a neural network is employed for action selection, the experience tuples may be used to adjust weight values of the neural network. As a result, the neural network is trained for selecting actions for the environment 220. When the RL system 200 is a DRL system, a deep neural network can be used as a function approximator to select an action, i.e., $f(S_t) \rightarrow \Delta t$.

The observed Reward $R_t$ is the change in maximum combined sum-rate, i.e., throughput, achievable by all groups as a result of the channel assignment. Channel assignment actions may result in positive and/or negative rewards. In other words, channel assignments may both increase communication bandwidth and interference. The Reward may account for intra-group signal to interference plus noise ratio (SINR) reduction due to co-channel interference. The Reward may also account for the difference in channel bandwidths. The sum-rate may be weighted per user group and/or per channel to reflect spectrum policies and user priorities.

According to another embodiment, a more complex Reward structure may be employed to steer the learning process to meet various objectives. A tuning parameter may also be used to emphasize one objective over the other based on the desired outcome of the learning process. For example, a minimum SINR or rate constraint could be imposed and penalizing Actions resulting in new or already assigned groups not meeting the constraint. The Reward may also include linear or non-linear combinations to achieve specific objectives. One examples includes an increase in total sum-rate and increase in the total number of groups satisfying the minimum SINR/rate.

Figure 4:
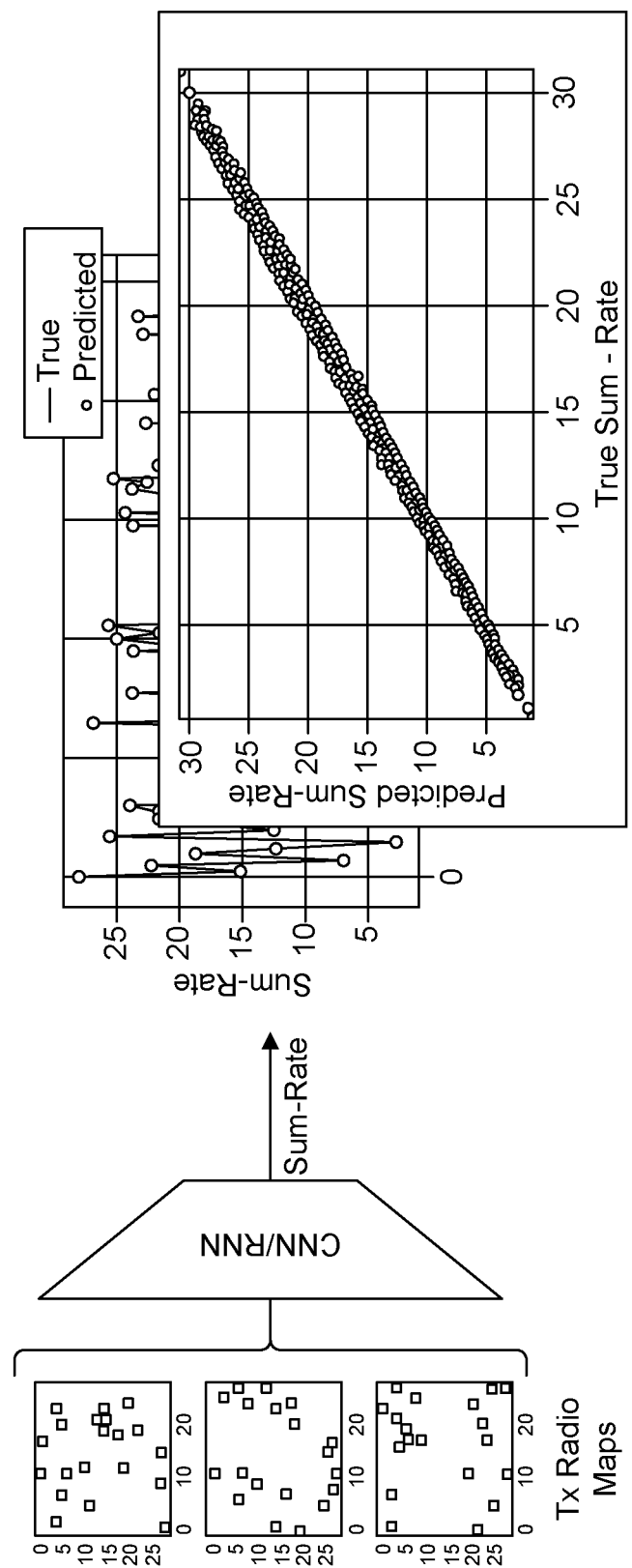
FIG. 4 illustrates the environmental state representation of FIG. 3 used to develop sum rate predictions for simulating deep learning training according to an aspect of the application.

According to an embodiment, FIG. 4 illustrates the environmental state representation being run through a convolutional neural network (CNN)/Recurrent neural network (RNN) producing an optimal sum-rate. That is, when the motion of transceivers is included, the static images become video clips and the RNNs may be applied to enhance the learning of this mapping in dynamic environments. Alternatively, these multiple frames can be processed as layers by a CNN. Employing CNNs/RNNs allows the RL agent to discover complex nonlinear mappings from the images ultimately to ascertain the best spectrum allocation actions to take. It is envisaged in this application that there are many learning algorithms that can be employed. These include, for example, DQN (Deep Q-Learning), DDQN (Double and Dueling Deep Q-Learning), REINFORCE, Asynchronous Advantage Actor-Critic (A3C), Advantage Actor-Critic (A2C), Soft Actor-Critic, and Proximal-Policy Optimization.

According to another embodiment, plural Agents may act in the Environment 220. The Agents may be configured to fully or partially observe the Environment. The Agents may also be configured to share Reward information among one another based on previous actions. In so doing, the network can be further optimized to improve throughput in a reduced period of time. Performing such actions among plural Agents in communication with one another to optimize throughput is something that could not practically be performed by the human mind. In an exemplary embodiment, one or more of the plural Agents are represented as gateway devices 14 depicted in FIG. 1A or nodes 30 depicted in FIG. 1B.

Dynamic Spectrum Allocation (DSA)/Dynamic Spectrum Sharing (DSS) Training

Figure 5:
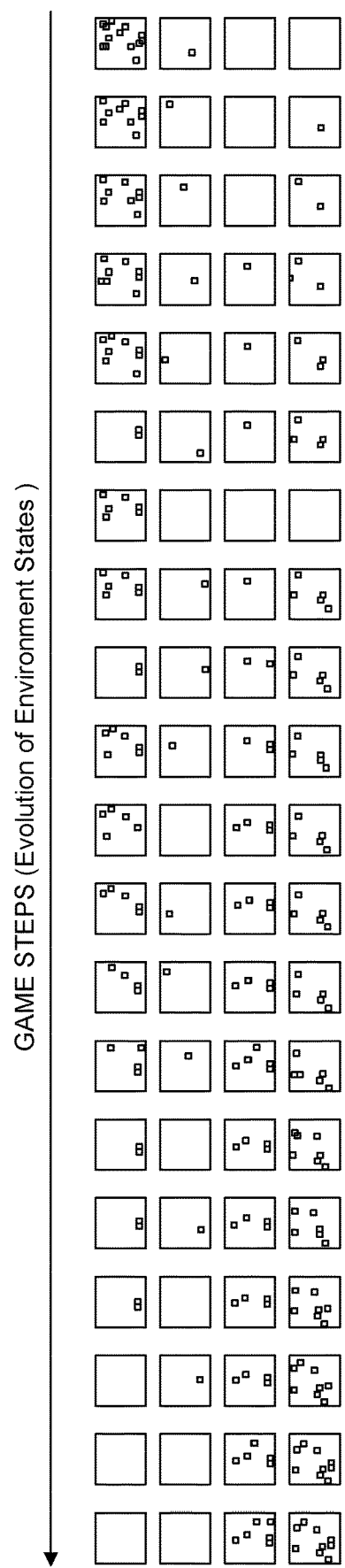
FIG. 5 illustrates a dynamic spectrum access gaming episode used for training according to an aspect of the application.

According to an aspect of the application, DSA/DSS training is performed by playing channel assignment games. An example of a channel assignment game episode is depicted in FIG. 5. Specifically, the game episode starts with no channel assignments. As shown in FIG. 5, the first row is indicative of the environmental state mapping depicted in FIG. 3. Based on a particular channel assignment action $A_t$ and its associated reward $R_t$, a subsequent environmental representation is created represented by the next row in FIG. 5. The channel assignment game is repeated until all unassigned groups of transceivers are allocated among available channels.

As discussed earlier in the application, the observed Reward $R_t$ is the change in maximum combined sum-rate, i.e., throughput, achievable by all groups as a result of the channel assignment. Channel assignment actions may result in positive and/or negative rewards. In other words, channel assignments may both increase communication bandwidth and interference. The Reward may account for intra-group SINR reduction caused by co-channel interference. The Reward may also account for the difference in channel bandwidths. The sum-rate may be weighted per user group and/or per channel to reflect spectrum policies and user priorities.

Figure 6:
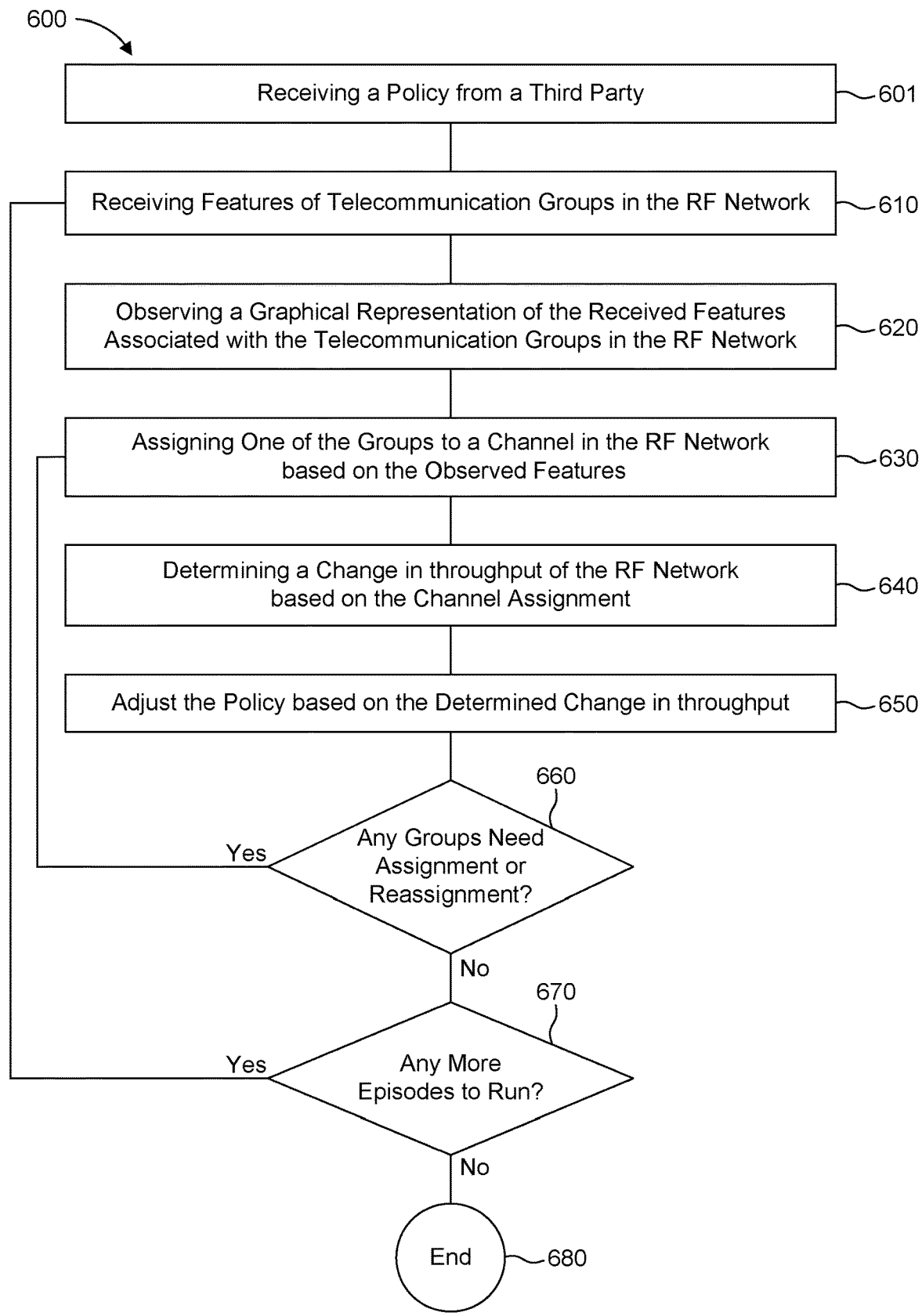
FIG. 6 illustrates a data and process flow chart according to an aspect of the application.

According to an exemplary embodiment of the aspect directed to DSA/DSS training, FIG. 6 describes a flow chart 600 for training the learning algorithm 215 being executed by the processor of the RL agent 210. As depicted in this flow chart, the RL agent 210 receives a policy from a third party (Step 601). The policy from the third party may be based upon levels close to a common-sense heuristic policy. For instance, this may include making greedy decisions using instantaneous measurements of interference on each of the candidate channels and choosing one of the channels exhibiting the smallest interference level. In another embodiment, the policy may be based on training data obtained from another neural network. The training data may be real. Alternatively, the training data may be simulated.

Then the DRL is applied to learn further optimizations and refinement that reflect complex dynamics and dependencies of the environment. There are several methods that allow bootstrapping real-world learning if a near-optimal policy (such as greedy algorithm) is known, including behavior cloning, inverse RL and generative adversarial imitation learning, to name a few.

Next, the RL agent 210 receives features of the telecommunication groups located in the RF network (Step 610). The features may further define pixels appearing in the one or more images representing a position in space of communication groups. As discussed above, a pixel's intensity is indicative of signal power. More specifically, pixel intensity features may correspond to one or more of transmit power, SINR levels and measured interference. Separately, motion of transceivers/nodes may be captured through multiple successive frames from some time in the past until present. All of the frames constitute the state of the environment used for training a learning algorithm present in the RL agent 210.

The RL agent 210 subsequently observes a graphical representation of the received features associated with the telecommunication groups in the RF network (Step 620). As discussed earlier, the graphical representation can be based upon an input format required by a CNN and/or RNN. Moreover, the graphical representation can be based upon a specific period of time. The observation is considered an initial state $S_t$ and includes an initial $R_t$. As discussed above, a reward or throughput may be calculated according to a predefined cost function indicating an objective for adjusting or optimizing the environment 220. A reward is indicative of an action that positively or negatively contributes to moving the environment from one state to another state with respect to the cost function. For purposes of training, it is equally important to explore and understand actions leading to both an increase and decrease in throughput. In so doing, the best policy for maximizing overall throughput after all assignment are made can be discerned by the RL agent 210.

Next, the RL agent 210 assigns one of the groups to a channel in the RF network based on the observed features (Step 630). The assignment is performed based on existing spectrum policies at the RL agent 210. The RL agent 210 subsequently determines a change in throughput, otherwise known as a reward or outcome, of the RF network based on the channel assignment of the one group (Step 640). The reward can be positive or negative since channel assignments can both increase communication bandwidth and interference. The reward can account for intra-group SINR reduction due to co-channel interference and for the difference in channel bandwidths. The sum-rate may be weighted per user group and/or per channel to reflect spectrum policies and user priorities. More complex reward structures can be employed to steer the learning process to meet various objectives under multiple constraints. As discussed above, one of the objectives can included a minimum SINR/rate constraint and penalties for not meeting it. Another objective can include linear or non-linear combinations of multiple objectives. For instance, this can include (1) increased total sum-rate and (2) increase in the total number of groups satisfying the minimum SINR/rate. Tuning parameters can also be employed where one objective is favored over the other. In other words, instead of both objectives being factored equally in the overall throughput, one objective could be heavily favored over the other (e.g., 2:1).

Thereafter, the RL agent 210 adjusts the policy received from a third party in step 601 based on the determined changed in throughput in Step 640 (Step 650). The adjustment can be based on a batch historical action. Alternatively, the adjustment can be based on reward sequences.

Further, the RL agent 210 queries whether any additional groups need assignment (Step 660). If the query results in an affirmative response, the RL agent 210 performs each of steps 630, 640 and 650 described above for the additional group.

In another embodiment, Step 660 also queries whether any of the groups require reassignment or reallocation. This means groups that are already assigned to a channel are assigned to different channels in favor of more desirable configurations. Doing so can ultimately result in a higher overall reward. It is envisaged that reassignment or reallocation can require different spectrum policies from those traditionally employed for an original assignment. For example, certain channel assignments can be masked off. Additionally, masking may be directed to certain groups of users versus others.

Once the RL agent 210 concludes no more assignments or reassignments are needed in Step 660, the RL agent moves on to another query. Specifically, the RL agent 210 inquires whether any more game episodes need to be run (Step 670). If the answer is in the affirmative, the RL agent returns to step 610 of the flowchart where features of telecommunication groups in the RF network are received. If no further game episodes need to be run, the RL agent 210 ends the process in Step 680.

Figure 7:
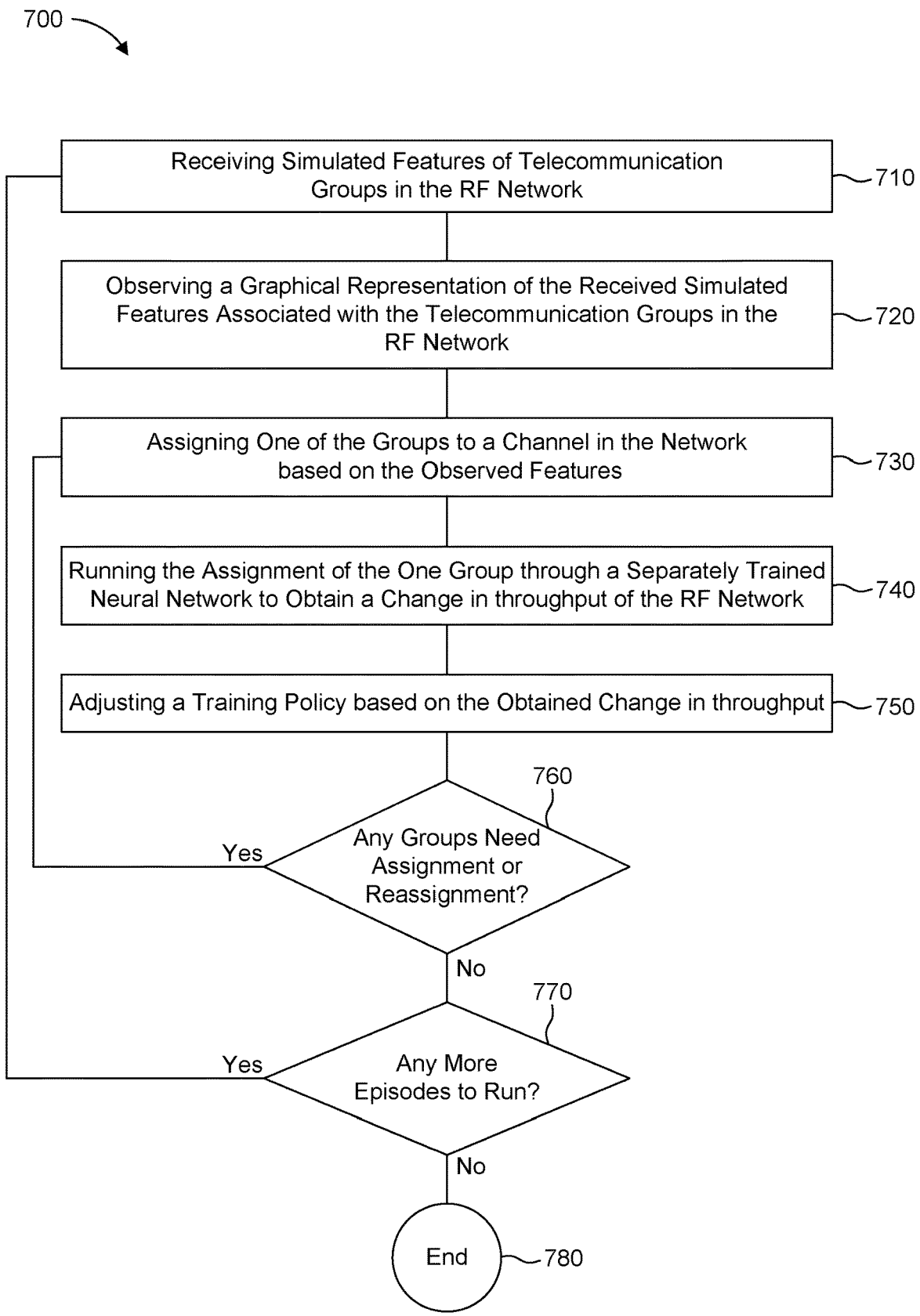
FIG. 7 illustrates a data and process flow chart according to another aspect of the application

According to another exemplary embodiment of the aspect directed to DSA/DSS training, FIG. 7 describes a flow chart 700 for offline, simulated training. Specifically, a virtual environment with simulated actions can be used for training.

As depicted in this flow chart, the RL Agent 210 receives simulated features of telecommunication groups in the RF network (Step 710). The features may further define pixels appearing in the one or more images representing a position in space of communication groups. As discussed above, a pixel's intensity is indicative of signal power. More specifically, pixel intensity features may correspond to one or more of transmit power, SINR levels and measured interference. Separately, motion of transceivers/nodes may be captured through multiple successive frames from some time in the past until present. All of the frames constitute the state of the environment used for training a learning algorithm present in the RL agent 210.

The RL agent 210 subsequently observes a graphical representation of the received features associated with the telecommunication groups in the RF network (Step 720). As discussed earlier, the graphical representation can be based upon an input format required by neural network, such as for example a CNN and/or RNN. Moreover, the graphical representation can be based upon a specific period of time. The observation is considered an initial state $S_t$ and includes an initial $R_t$. As discussed above, a reward or throughput may be calculated according to a predefined cost function indicating an objective for adjusting or optimizing the environment 220. A reward is indicative of an action that positively or negatively contributes to moving the environment from one state to another state with respect to the cost function. For purposes of training, it is equally important to explore and understand actions leading to both an increase and decrease in throughput. In so doing, the best policy for maximizing overall throughput after all assignment are made can be discerned by the RL agent 210.

Next, the RL Agent 210 assigns one of the groups to a channel in the network based on the observed features of the pixel and the reward (Step 730). The assignment is performed based on existing spectrum policies at the RL agent 210.

Thereafter, RL agent 210 employs a separately trained neural network to obtain a reward of the assignment of the group (Step 740). More specifically, this separately trained neural network, during its own training/learning sequence, learns to map a one-layer image corresponding to one channel to the total throughput of all user groups assigned to that channel. Namely, it uses sense data (location, power, SINR, data rate) reported by user groups once they are on the channel. In one embodiment, the neural network is a CNN. In another embodiment, the neural network is a RNN. In yet another embodiment the neural network employs supervised learning during training.

According to Step 740, RL agent 210 executes a step of running the assignment through a separately trained neural network. In so doing, a sum-rate change/reward is obtained via comparing predicted throughputs based on a state preceding the assignment action and a state following the assignment action. The sum-rate change/reward can be positive or negative since channel assignments can both increase communication bandwidth and interference. The reward can account for intra-group SINR reduction due to co-channel interference and for the difference in channel bandwidths. The reward may be weighted per user group and/or per channel to reflect spectrum policies and user priorities. More complex reward structures can be employed to steer the learning process to meet various objectives under multiple constraints. As discussed above, one of the objectives can included a minimum SINR/rate constraint and penalties for not meeting it. Another objective can include linear or non-linear combinations of multiple objectives. For instance, this can include (1) increased total sum-rate and (2) increase in the total number of groups satisfying the minimum SINR/rate. Tuning parameters can also be employed where one objective is favored over the other. In other words, instead of both objectives being factored equally in the overall throughput, one objective could be heavily favored over the other (e.g., 2:1).

Thereafter, the RL agent 210 adjusts a training policy of the neural network based on the received changed in throughput via the separately trained neural network in Step 740 (Step 750). The adjustment can be based on a batch historical action. Alternatively, the adjustment can be based on reward sequences.

Even further, the RL agent 210 queries whether any additional groups need assignment (Step 760). If the query results in an affirmative response, the RL agent 210 performs each of steps 730, 740 and 750 described above for the additional group.

In another embodiment, Step 760 also queries whether any of the groups require reassignment or reallocation. This means groups that are already assigned to a channel are assigned to different channels in favor of more desirable configurations. Doing so can ultimately result in a higher overall reward. It is envisaged that reassignment or reallocation can require different spectrum policies from those traditionally employed for an original assignment. For example, certain channel assignments can be masked off. Additionally, masking may be directed to certain groups of users versus others.

Once the RL agent 210 concludes no more assignments or reassignments are needed in Step 760, the RL agent moves on to another query. Specifically, the RL agent 210 inquires whether any more game episodes need to be run (Step 770). If the answer is in the affirmative, the RL agent returns to step 710 of the flowchart where features of telecommunication groups in the RF network are received. If no further game episodes need to be run, the RL agent 210 ends the process in Step 780.

Figure 8:
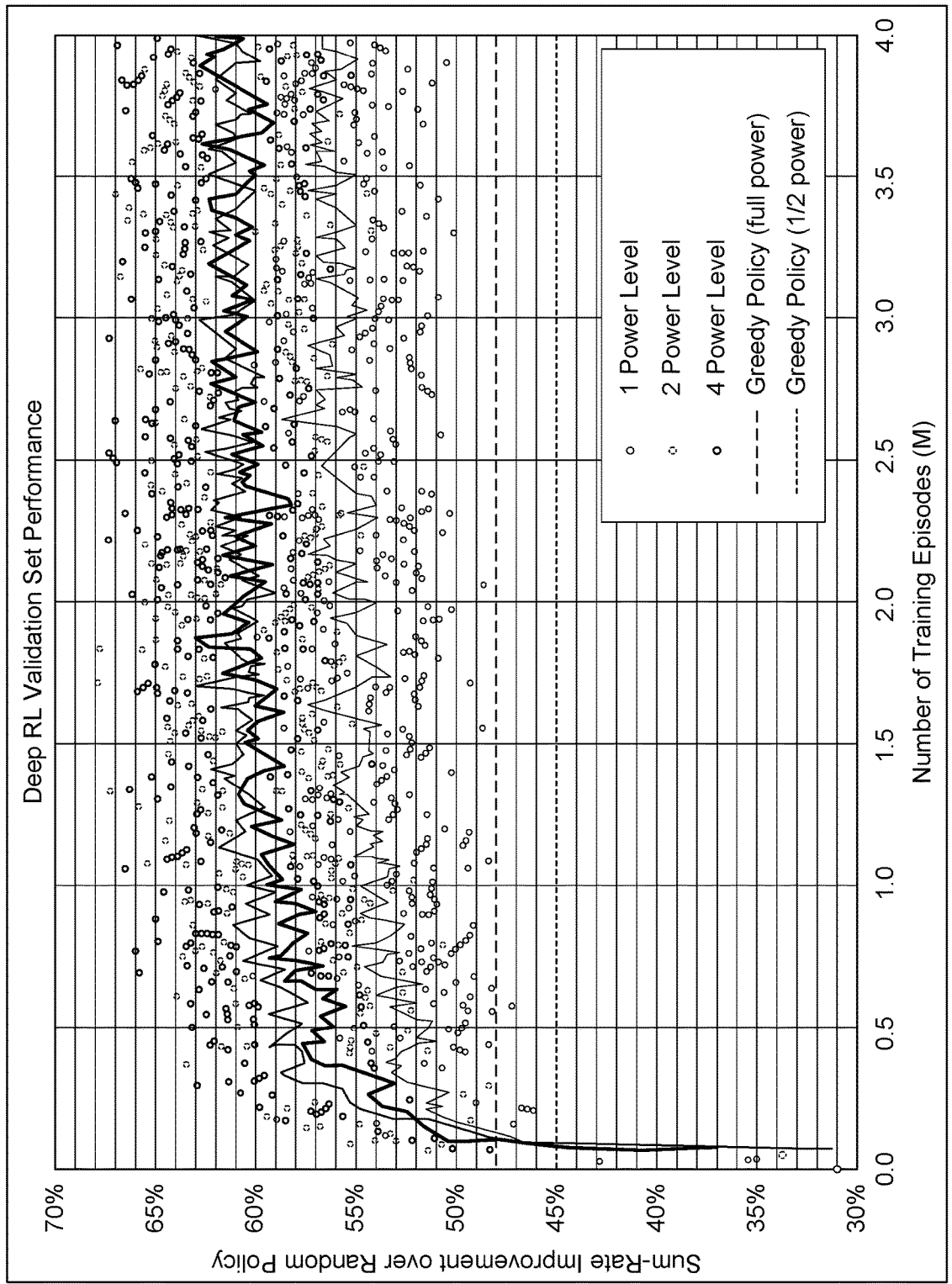
FIG. 8 illustrates the results of employing deep reinforcement learning training for dynamic spectrum access and spectrum sharing versus a heuristic approach according to an aspect of the application.

According to an exemplary embodiment as depicted in FIG. 8, the results of RL agent's training algorithm using DRL-DDQN are provided. The y-axis indicates a percentage improvement in the total sum-rate relative to a random channel selection policy. Specifically, the results are indicative of successful learning of the policy achieving better performance than a greedy heuristic approach based on immediate interference measurements. In other words, the channel with the lowest interference by candidate user group is chosen for the next assignment. As can be seen from the results in FIG. 8, the RL agent 210 starts at the same level of performance as when employing random assignments. The RL agent 210 reaches the level of the greedy algorithm (y~45-47%) after about 100,000 training episodes.

FIG. 8 also depicts the DRL algorithm's ability to perform joint channel assignment and power allocation when the action space includes channel and power level decisions with a discrete set of 2 or 4 levels. FIG. 8 also shows that DRL outperforms heuristic policies by up to ~35% while jointly optimizing channel and power level allocation without reliance on any propagation model assumptions.

One of the real world challenges in applying the above DRL approach is obtaining enough data for training the Agent(s). Beginning a training process from a completely random policy and learning from scratch can result in both good and bad channel assignment decisions. The volume of various training scenarios necessary for convergence of the training procedure may be far greater than what a real system can ever collect by taking real actions and observing its rewards.

According to an embodiment, the present application further describes a training process that can start from levels close to a common-sense heuristic policy, such as for example, making greedy decisions using instantaneous measurements of interference on each of the candidate channels and choosing a channel with the smallest interference level. DRL is subsequently applied to learn further optimizations and refinement that reflect complex dynamics and dependencies of the environment. There are several methods that allow bootstrapping real-world learning if a near-optimal policy, e.g., greedy algorithm, is known including behavior cloning, inverse RL and generative adversarial imitation learning, to name a few.

DRL training can also be done offline prior to any actual actions are taken. In the meantime, a heuristic greedy policy may be employed while the data for environmental modeling and DRL training is collected. To do this, a virtual environment with simulated actions can be used for training. This virtual environment realistically models the sum-rate resulting from a specific channel assignment given certain spatial and transmission power distribution of groups. Rewards associated with actions can be supplied to the agent during simulated DRL training.

To create a mapping from spatial and transmission power distributions of groups to sum-rate, a separate deep (convolutional) neural network can be trained in a supervised manner. To obtain data for this training, distributed sensing of the environment is performed using either the same participating radios, specialized sensors or historical data from previous deployments and even unrelated tasks. Sensors and transmitters exchange, among themselves or with the centralized controller, time-stamped information about transmit powers, received aggregate interference and locations.

In many real-world scenarios, the DRL approach may need to be scaled up to larger geographic areas and number of groups. Beyond a certain level of network complexity, it may become computationally infeasible to train a single agent to accommodate the entire network. Several solutions are envisaged according to the present application to address these aspects.

The first solution includes distributed learning. In distributed learning, multiple agents are assigned to each group, or a collection of groups within a close proximity. The agents exchange information, e.g., transmit power, and aggregate interference, etc., that allows them to construct their own representation of the environment according to the concepts described in the present application. Namely the agents are informed about actions of other agents and the values of rewards. The environmental model learned by each agent is approximately similar through not entirely the same. A mechanism can be used to perform periodic synchronization of models by exchanging network weights. There may or may not be a mechanism to choose the next action by agents' voting.

Another solution includes hierarchical learning. Hierarchical learning over smaller regions takes advantage of RF isolation with the distance and terrain characteristics, combined with higher level learning over multiple regions.

While the system and method have been described in terms of what are presently considered specific embodiments, the disclosure need not be limited to the disclosed embodiments. It is intended to cover various modifications and similar arrangements included within the spirit and scope of the claims, the scope of which should be accorded the broadest interpretation to encompass all such modifications and similar structures. The present disclosure includes any and all embodiments of the following claims.

What is claimed is:

1. A method of training a neural network via deep reinforcement learning (DRL) comprising the steps of:
   receiving, via the neural network, a policy from a third party;
   receiving, via the neural network, features of plural telecommunication groups located in an RF network;
   observing, via the neural network, a graphical representation of the received features of the plural telecommunication groups in the RF network;
   assigning, based on the observation, one of the plural telecommunication groups to one of plural channels in the RF network;
   determining, via the neural network, a change in throughput of the RF network based on the assignment; and
   adjusting, based on the determined change in throughput, the policy received from the third party via the DRL,
   wherein the features include pixel intensity based upon one or more of transmit power, signal to noise ratio levels and measured interference.

2. The method of claim 1, further comprising:
   determining, via the neural network, whether another one of the plural telecommunication groups requires assignment to the plural channels in the RF network;
   assigning, based on the observation, the other one of the plural telecommunication groups to the one channel or another one of the plural channels in the RF network; and
   determining, via the neural network, a change in throughput of the RF network based on the assignment of the other one of the plural telecommunication groups.

3. The method of claim 2, further comprising:
   revising, based on the determined change in throughput of the RF network, the adjusted policy.

4. The method of claim 1, further comprising:
   determining, via the neural network, all of the plural telecommunication groups have been allocated to one or more of the plural channels in the RF network.

5. The method of claim 1, further comprising:
   determining, via the neural network, whether the assigned one of the plural telecommunication groups requires reassignment from the one channel to another one of the plural channels in the RF network.

6. The method of claim 1, wherein
   the change in throughput is based on the one of the telecommunication groups meeting a constraint, and
   the constraint includes one or more of a minimum rate and a minimum signal to interference plus noise ratio.

7. The method of claim 6, wherein the change in throughput is based non-linear combinations of the constraint.

8. The method of claim 1, wherein the change in throughput is based on one or more of a weighted vector of communication bandwidth and interference, weighted per telecommunication group, and weighted per channel.

9. The method of claim 1, wherein the features include a pixel position in space.

10. The method of claim 1, wherein the graphical representation includes multi-dimensional images including videos.

11. The method of claim 1, wherein
   the graphical representation includes an assignment status of the plural telecommunication groups in the RF network, and
   the assignment status is selected from the group consisting of unassigned, candidate for assignment, assigned to channels 1 . . . N and combinations thereof.

12. The method of claim 1, wherein the assigning step is based on one or more of power level, power level range and bandwidth of the channel.

13. A non-transitory computer readable medium including stored instructions of training a neural network via deep reinforcement learning (DRL) which, when executed by a processor, effectuates:
   receiving, via the neural network, a policy from a third party;
   receiving, via the neural network, features of plural telecommunication groups located in an RF network;
   observing, via the neural network, a graphical representation of the received features of the plural telecommunication groups in the RF network;
   assigning, based on the observation, one of the plural telecommunication groups to one of plural channels in the RF network;
   determining, via the neural network, a change in throughput of the RF network based on the assignment; and
   adjusting, based on the determined change in throughput, the policy received from the third party via the DRL,
   wherein the features include pixel intensity based upon one or more of transmit power, signal to noise ratio levels and measured interference.

14. The non-transitory computer readable medium of claim 13, wherein the stored instructions when executed by the processor further effectuates:
- determining, via the neural network, whether another one of the plural telecommunication groups requires assignment to the plural channels in the RF network;
- assigning, based on the observation, the other one of the plural telecommunication groups to the one channel or another one of the plural channels in the RF network; and
- determining, via the neural network, a change in throughput of the RF network based on the assignment of the other one of the plural telecommunication groups.

15. The non-transitory computer readable medium of claim 14, wherein the stored instructions when executed by the processor further effectuates:
- revising, based on the determined change in throughput of the RF network, the adjusted policy.

16. The non-transitory computer readable medium of claim 13, wherein the stored instructions when executed by the processor further effectuates:
- determining, via the neural network, all of the plural telecommunication groups have been allocated to one or more of the plural channels in the RF network.

17. The non-transitory computer readable medium of claim 13, wherein the stored instructions when executed by the processor further effectuates:
- determining, via the neural network, whether the assigned one of the plural telecommunication groups requires reassignment from the one channel to another one of the plural channels in the RF network.

18. The non-transitory computer readable medium of claim 13, wherein
- the change in throughput is based on the one of the telecommunication groups meeting a constraint, and
- the constraint includes one or more of a minimum rate and a minimum signal to interference plus noise ratio.

19. The non-transitory computer readable medium of claim 18, wherein the change in throughput is based non-linear combinations of the constraint.

20. The non-transitory computer readable medium of claim 13, wherein the change in throughput is based on one or more of a weighted vector of communication bandwidth and interference, weighted per telecommunication group, and weighted per channel.

\* \* \* \* \*